United States Patent
Hagihara et al.

(10) Patent No.: US 12,103,667 B2
(45) Date of Patent: Oct. 1, 2024

(54) EHA SYSTEM FOR LIFTING/LOWERING LANDING GEAR

(71) Applicant: SUMITOMO PRECISION PRODUCTS CO., LTD., Hyogo (JP)

(72) Inventors: Shogo Hagihara, Hyogo (JP); Takaaki Onishi, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 91 days.

(21) Appl. No.: 17/911,811

(22) PCT Filed: Dec. 8, 2020

(86) PCT No.: PCT/JP2020/045722
§ 371 (c)(1),
(2) Date: Sep. 15, 2022

(87) PCT Pub. No.: WO2021/186808
PCT Pub. Date: Sep. 23, 2021

(65) Prior Publication Data
US 2023/0174222 A1 Jun. 8, 2023

(30) Foreign Application Priority Data
Mar. 17, 2020 (JP) .................. 2020-046627

(51) Int. Cl.
*B64C 25/22* (2006.01)
*F15B 15/20* (2006.01)
(52) U.S. Cl.
CPC .............. *B64C 25/22* (2013.01); *F15B 15/20* (2013.01)
(58) Field of Classification Search
CPC ...... B64C 25/10; F15B 11/17; F15B 21/0427; F15B 19/005
See application file for complete search history.

(56) References Cited

U.S. PATENT DOCUMENTS

| | | | | |
|---|---|---|---|---|
| 2012/0221262 | A1* | 8/2012 | Nakagawa | G05B 23/0237 702/58 |
| 2014/0151501 | A1 | 6/2014 | Kondo et al. | |
| 2017/0069145 | A1* | 3/2017 | Dorkel | G07C 5/006 |

FOREIGN PATENT DOCUMENTS

| | | | |
|---|---|---|---|
| CN | 104454791 A | 3/2015 | |
| DE | 102018129220 A1 * | 5/2020 | F04B 49/065 |

(Continued)

OTHER PUBLICATIONS

International Search Report and Written Opinion for PCT/JP2020/045722 (ISA/JP) mailed Mar. 2, 2021 (9 pages).

*Primary Examiner* — Timothy D Collins
*Assistant Examiner* — Eric Acosta
(74) *Attorney, Agent, or Firm* — Alston & Bird LLP

(57) ABSTRACT

An EHA system (10) for lifting or lowering a leg of an aircraft includes a hydraulic circuit (101) having a hydraulic actuator (a hydraulic cylinder 2) configured to lift or lower the leg, at least one electric hydraulic pump (3), and a hydraulic path, a pressure sensor (38, 83), a temperature sensor (84), and a control unit (a controller 9) configured to output a control signal for operating the electric hydraulic pump in leg lifting or lowering. The hydraulic circuit includes a pressure increasing element. The control unit performs health monitoring regarding the performance of the electric hydraulic pump based on the pressure of hydraulic fluid, the temperature of hydraulic fluid, and the speed of the electric hydraulic pump during operation of the electric hydraulic pump.

10 Claims, 7 Drawing Sheets

(56) References Cited

FOREIGN PATENT DOCUMENTS

| GB | 2428650 A | * | 2/2007 | ............. B64C 25/22 |
| --- | --- | --- | --- | --- |
| JP | 2012-176645 A | | 9/2012 | |
| JP | 2014-132189 A | | 7/2014 | |

* cited by examiner

EHA SYSTEM FOR LIFTING/LOWERING LANDING GEAR

CROSS REFERENCE TO RELATED APPLICATIONS

This application is a National Stage Application, filed under 35 U.S.C. § 371, of International Application No. PCT/JP2020/045722, filed Dec. 8, 2020, which claims priority to Japanese Application No. 2020-046627, filed Mar. 17, 2020; the contents of both of which as are hereby incorporated by reference in their entirety.

BACKGROUND

Related Field

The technique disclosed herein relates to an electro hydrostatic actuator (EHA) system for lifting or lowering a leg of an aircraft.

Description of Related Art

Japanese Unexamined Patent Publication No. 2014-132189 describes an EHA system configured to lift or lower a leg of an aircraft. The EHA system includes a hydraulic actuator and an electric hydraulic pump. The electric hydraulic pump supplies hydraulic fluid to the hydraulic actuator. The hydraulic actuator to which hydraulic fluid has been supplied lifts or lowers the leg. With the EHA system, use of a conventional hydraulic system mounted on an aircraft can be stopped. The EHA system is advantageous in improvement in fuel consumption of the aircraft.

BRIEF SUMMARY

In some cases, the performance of the electric hydraulic pump is degraded due to breakdown or aging. As the performance of the electric hydraulic pump is degraded, a time required for leg lifting or lowering increases. The EHA system determines that the electric hydraulic pump has been broken down when the time required for leg lifting or lowering exceeds a limit time.

The broken electric hydraulic pump needs to be replaced or repaired. Use of the aircraft needs to be stopped for replacement or repairment of the electric hydraulic pump, and for this reason, a use schedule for the aircraft is influenced.

For example, if the EHA system can monitor the performance of the electric hydraulic pump before it is determined that the electric hydraulic pump has been broken down, a timing of requiring replacement or repairment of the electric hydraulic pump can be predicted. If the timing of requiring replacement or repairment of the electric hydraulic pump can be predicted, the influence on the operation schedule for the aircraft can be reduced to the minimum.

However, for the EHA system configured to lift or lower the leg of the aircraft, a technique regarding health monitoring for the electric hydraulic pump has not been achieved so far.

The technique disclosed herein achieves health monitoring for the electric hydraulic pump in the EHA system for lifting or lowering the leg.

The technique disclosed herein relates to an EHA system for lifting or lowering a leg of an aircraft. The EHA system includes a hydraulic circuit including a hydraulic actuator attached to the leg to lift or lower the leg, at least one electric hydraulic pump configured to discharge hydraulic fluid supplied to the hydraulic actuator, and a hydraulic path connecting the hydraulic actuator and the electric hydraulic pump to each other, a pressure sensor configured to output a measurement signal corresponding to the pressure of hydraulic fluid in the hydraulic circuit during operation of the electric hydraulic pump, a temperature sensor configured to output a measurement signal corresponding to the temperature of hydraulic fluid, and a control unit configured to output a control signal for operating the electric hydraulic pump to the electric hydraulic pump, the hydraulic circuit including a pressure increasing element configured to increase the pressure of hydraulic fluid discharged from the electric hydraulic pump, and the control unit performing health monitoring regarding the performance of the electric hydraulic pump based on the pressure of hydraulic fluid based on the measurement signal of the pressure sensor, the temperature of hydraulic fluid based on the measurement signal of the temperature sensor, and the speed of the electric hydraulic pump during operation of the electric hydraulic pump.

According to this configuration, the control unit operates the electric hydraulic pump in leg lifting or lowering, for example. For example, the control unit may perform, based on the measurement signal of the pressure sensor, feedback control such that the discharge pressure of the electric hydraulic pump reaches a target pressure. In feedback control, the control unit uses the speed of the electric hydraulic pump and the temperature of hydraulic fluid associated with the viscosity of hydraulic fluid.

The control unit performs health monitoring regarding the performance of the electric hydraulic pump based on the pressure of hydraulic fluid based on the measurement signal of the pressure sensor, the temperature of hydraulic fluid based on the measurement signal of the temperature sensor, and the speed of the electric hydraulic pump. Note that the speed of the electric hydraulic pump can be acquired based on the control signal output from the control unit to the electric hydraulic pump.

An administrator of the aircraft can predict, based on a health monitoring result, a timing of requiring replacement or repairment of the electric hydraulic pump. Since the timing of requiring replacement or repairment of the electric hydraulic pump can be predicted, the administrator of the aircraft can determine, in advance, a timing of stopping use of the aircraft for replacement or repairment of the electric hydraulic pump. The aircraft equipped with the EHA system can perform health monitoring for the electric hydraulic pump, and therefore, influence on an operation schedule can be reduced to the minimum.

Even without attaching a flow rate sensor configured to measure the discharge flow rate of the electric hydraulic pump to the hydraulic circuit, the control unit can diagnose the performance of the electric hydraulic pump. The configuration of the EHA system is simplified. Since the sensor which is not always required for feedback control is not added to the EHA system, degradation of the reliability of the EHA system can be reduced.

The pressure increasing element may be the hydraulic actuator, and the control unit may calculate the actual discharge flow rate of the electric hydraulic pump based on the pressure of hydraulic fluid, the temperature of hydraulic fluid, and the speed of the electric hydraulic pump during leg lifting by the hydraulic actuator, a time required for leg lifting by the hydraulic actuator, and the amount of hydraulic fluid required for leg lifting by the hydraulic actuator, and calculate the volumetric efficiency of the electric hydraulic pump from the calculated actual discharge flow rate and the ideal discharge flow rate of the electric hydraulic pump determined from the speed of the electric hydraulic pump.

The amount of hydraulic fluid required for leg lifting by the hydraulic actuator is a known value. With this value, the control unit can calculate the actual discharge flow rate of the electric hydraulic pump based on the pressure of hydraulic fluid, the temperature of hydraulic fluid, the speed of the electric hydraulic pump, and the time required for leg lifting by the hydraulic actuator. Specifically, the actual discharge flow rate Q of the electric hydraulic pump can be calculated according to Expression (1-1) below.

[Expression 1]

$$Q = V_{th} \cdot \omega - \alpha \frac{\Delta P}{T} \quad (1\text{-}1)$$

In this expression, $V_{th}$ is the ideal discharge flow rate of the electric hydraulic pump per rotation, and is a known value determined from the specifications of the electric hydraulic pump. $\omega$ is the speed of the electric hydraulic pump. $V_{th} \cdot \omega$ is the ideal discharge flow rate of the electric hydraulic pump.

$\Delta P$ is a difference between the outlet pressure and the inlet pressure of the electric hydraulic pump. T is the temperature of hydraulic fluid. $\alpha$ is a coefficient regarding leakage inside the electric hydraulic pump, and is an unknown value. The actual discharge flow rate Q of the electric hydraulic pump is equivalent to a value obtained in such a manner that the leakage loss of the electric hydraulic pump is subtracted from the ideal discharge flow rate of the electric hydraulic pump.

There is a relationship of Expression (1-2) between the actual discharge flow rate Q of the electric hydraulic pump and the amount $V_{act}$ of hydraulic fluid required for leg lifting by the hydraulic actuator.

[Expression 2]

$$V_{act} = \int_0^{t1} Q \, dt = \int_0^{t1} \left( V_{th} \cdot \omega - \alpha \frac{\Delta P}{T} \right) dt \quad (1\text{-}2)$$

In this expression, t1 is the time required for leg lifting by the hydraulic actuator. The control unit can calculate the actual discharge flow rate Q of the electric hydraulic pump according to Expression (1-2).

The leakage loss of the electric hydraulic pump increases due to breakdown or aging. As the leakage loss of the electric hydraulic pump increases, a volumetric efficiency $\eta_v$ decreases. As the volumetric efficiency $\eta_v$ of the electric hydraulic pump decreases, the time required for leg lifting or lowering increases. When the time required for leg lifting or lowering exceeds a preset limit time, the electric hydraulic pump needs to be replaced or repaired. The volumetric efficiency is one of parameters indicating the performance of the electric hydraulic pump.

The volumetric efficiency of the electric hydraulic pump can be calculated according to Expression (1-3) below.

[Expression 3]

$$\eta_V = \frac{Q}{V_{th} \cdot \omega} \quad (1\text{-}3)$$

With the calculated actual discharge flow rate Q of the electric hydraulic pump, the control unit can calculate the volumetric efficiency $\eta_v$ of the electric hydraulic pump according to Expression (1-3). With the volumetric efficiency $\eta_v$ of the electric hydraulic pump, an administrator of the aircraft can predict a timing of replacement or repairment of the electric hydraulic pump.

According to the above-described configuration, the EHA system can perform health monitoring for the electric hydraulic pump based on the measurement signals of the pressure and temperature sensors etc. required for feedback control for the electric hydraulic pump.

The hydraulic actuator may be an extendable hydraulic cylinder.

For the extendable hydraulic cylinder, the amount of hydraulic fluid required for leg lifting is determined from a cylinder volume.

The hydraulic circuit may include a warm-up circuit in which hydraulic fluid circulates with bypassing the hydraulic actuator, the pressure increasing element may be a restrictor provided in the middle of the warm-up circuit and configured to increase the temperature of hydraulic fluid, and the control unit may calculate the actual discharge flow rate of the electric hydraulic pump based on the flow rate, which is determined from the pressure of hydraulic fluid and the temperature of hydraulic fluid, of hydraulic fluid passing through the restrictor during circulation of hydraulic fluid in the warm-up circuit, and calculate the volumetric efficiency of the electric hydraulic pump from the calculated actual discharge flow rate and the ideal discharge flow rate of the electric hydraulic pump determined from the speed of the electric hydraulic pump.

Since the restrictor is provided in the middle of the warm-up circuit, the temperature of hydraulic fluid gradually increases when hydraulic fluid circulates in the warm-up circuit. The restrictor may be an orifice, for example.

With the upstream and downstream pressures of the restrictor based on the measurement signal of the pressure sensor, the flow rate $Q_{ori}$ of hydraulic fluid passing through the restrictor can be calculated. Since hydraulic fluid circulates in the warm-up circuit, the actual discharge flow rate of the electric hydraulic pump and the flow rate of hydraulic fluid passing through the restrictor are coincident with or substantially coincident with each other. The control unit calculates the actual discharge flow rate Q of the electric hydraulic pump based on the flow rate, which is determined from the pressure of hydraulic fluid and the temperature of hydraulic fluid, of hydraulic fluid passing through the restrictor during circulation of hydraulic fluid in the warm-up circuit.

Specifically, the flow rate $Q_{ori}$ of hydraulic fluid passing through the restrictor can be calculated according to Expression (1-4) below.

[Expression 4]

$$Q_{ori} = C_D \cdot A \sqrt{\frac{2\Delta P}{\rho}} \quad (1\text{-}4)$$

In this expression, $C_D$ is the flow coefficient of the restrictor. A is the passage area of the restrictor. $\rho$ is the density of hydraulic fluid, and the density of hydraulic fluid is the function of the temperature of hydraulic fluid. $\Delta P$ is a difference between the upstream and downstream pressures of the restrictor, and in the warm-up circuit, corresponds to the difference between the outlet pressure and the inlet pressure of the electric hydraulic pump.

With the calculated actual discharge flow rate Q of the electric hydraulic pump, the control unit can calculate the volumetric efficiency $\eta_v$ of the electric hydraulic pump according to Expression (1-3). With the volumetric efficiency $\eta_v$ of the electric hydraulic pump, the administrator of the aircraft can predict the timing of replacement or repairment of the electric hydraulic pump.

The EHA system with this configuration can also perform health monitoring for the electric hydraulic pump without the need for attaching a flow rate sensor configured to measure the actual discharge flow rate of the electric hydraulic pump to the hydraulic circuit.

The electric hydraulic pump may include a first electric hydraulic pump and a second electric hydraulic pump, the first electric hydraulic pump and the second electric hydraulic pump may be connected in parallel with the hydraulic actuator, and the control unit may cause hydraulic fluid to circulate in the warm-up circuit by operating only the first electric hydraulic pump to perform health monitoring for the first electric hydraulic pump, and cause hydraulic fluid to circulate in the warm-up circuit by operating only the second electric hydraulic pump to perform health monitoring for the second electric hydraulic pump.

In a case where two electric hydraulic pumps, i.e., the first electric hydraulic pump and the second electric hydraulic pump, are operated, the control unit cannot perform health monitoring for each of the first electric hydraulic pump and the second electric hydraulic pump.

For this reason, the control unit performs health monitoring for the first electric hydraulic pump by operating only the first electric hydraulic pump. Moreover, the control unit performs health monitoring for the second electric hydraulic pump by operating only the second electric hydraulic pump. The electric hydraulic pumps are operated one by one, and therefore, the control unit can perform health monitoring for each of the first electric hydraulic pump and the second electric hydraulic pump.

The control unit may perform a warm-up operation of causing hydraulic fluid to circulate in the warm-up circuit by operating both the first electric hydraulic pump and the second electric hydraulic pump, and after the warm-up operation, perform health monitoring for the first electric hydraulic pump by operating only the first electric hydraulic pump and perform health monitoring for the second electric hydraulic pump by operating only the second electric hydraulic pump.

With this configuration, both the first electric hydraulic pump and the second electric hydraulic pump are operated so that the EHA system can promptly complete the warm-up operation. Before leg lifting or lowering and after completion of the warm-up operation, the EHA system can perform health monitoring for the first electric hydraulic pump and health monitoring for the second electric hydraulic pump. The temperature of hydraulic fluid is high in health monitoring, and therefore, the control unit can accurately execute health monitoring for the first electric hydraulic pump and health monitoring for the second electric hydraulic pump.

The EHA system may further include a notification unit configured to notify a result of health monitoring for the electric hydraulic pump in response to a control signal from the control unit.

With this configuration, the administrator of the aircraft can predict the timing of replacement or repairment of the electric hydraulic pump based on the notification from the notification unit.

The control unit may determine that the electric hydraulic pump is broken down in a case where a time until completion after the start of leg lifting exceeds a preset limit time.

With this configuration, the EHA system can diagnose breakdown of the electric hydraulic pump in addition to health monitoring for the electric hydraulic pump. The administrator of the aircraft can execute replacement or repairment of the electric hydraulic pump at a proper timing.

As described above, the EHA system for lifting or lowering the leg as disclosed herein can perform health monitoring for the electric hydraulic pump.

DETAILED DESCRIPTION OF VARIOUS EMBODIMENTS

Figure 1:
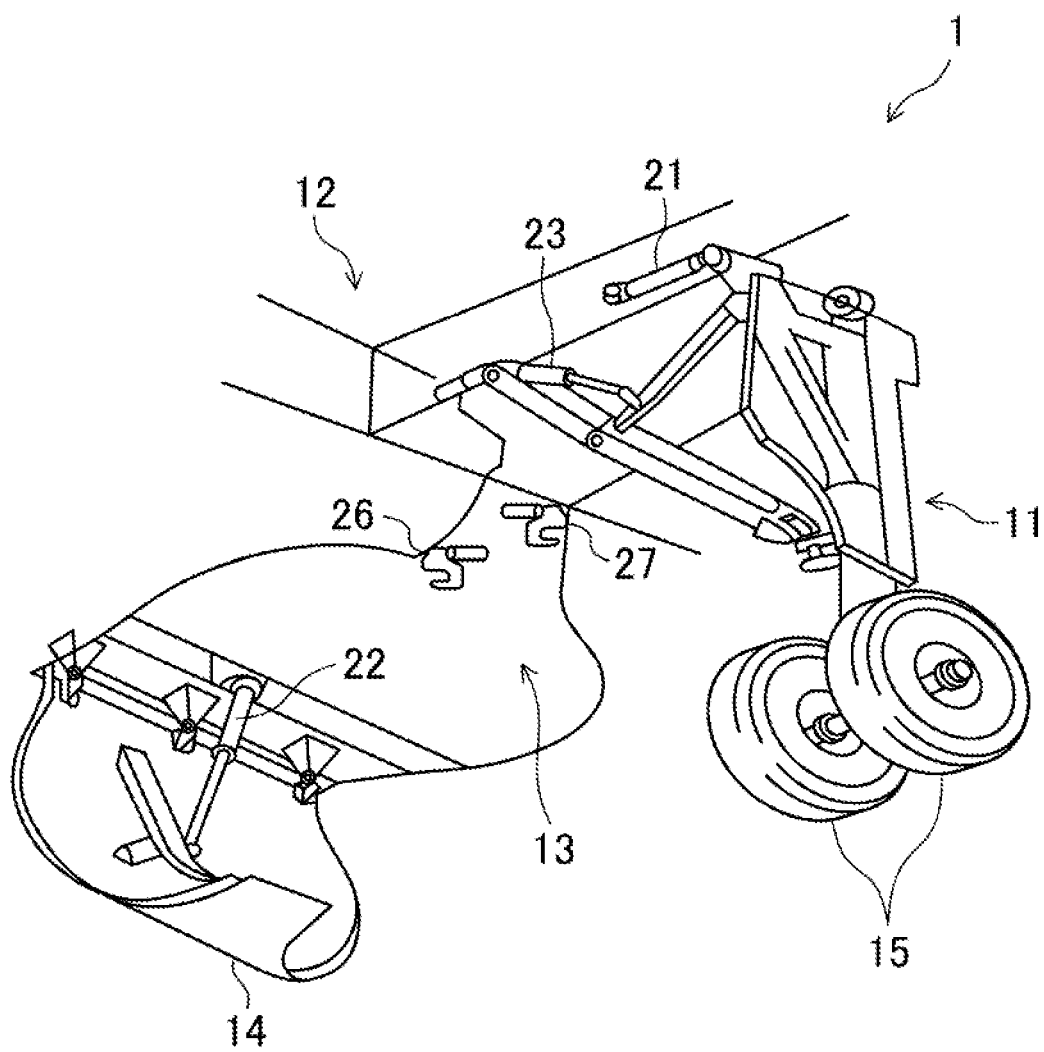
FIG. 1 is a perspective view showing, as an example, a landing gear of an aircraft.

Hereinafter, an embodiment of an EHA system for lifting or lowering a leg of an aircraft will be described with reference to the drawings. The EHA system described below is an example. FIG. 1 is a view showing an example of a landing gear 1 of the aircraft. The landing gear 1 is a main leg.

The landing gear 1 retracts a leg 11 in an airframe 12 and deploys the leg 11 from the airframe 12. Wheels 15 are attached to a distal end of the leg 11. The landing gear 1 has a gear cylinder 21, a door cylinder 22, a down-lock release cylinder 23, a door up-lock release cylinder 26, and a gear up-lock release cylinder 27.

The gear cylinder 21 lifts or lowers the leg 11. The door cylinder 22 opens or closes a door 14 of a bay 13. The bay 13 houses the leg 11. The down-lock release cylinder 23 releases a down-lock mechanism configured to fix a leg-lowered state. The door up-lock release cylinder 26 releases a door up-lock mechanism configured to fix the door in a lifted state. The gear up-lock release cylinder 27 releases a gear up-lock mechanism configured to fix the leg 11 in a lifted state. Each of the cylinders 21, 22, 23, 26, 27 is a hydraulic extension cylinder. Each of the cylinders 21, 22, 23, 26, 27 is an example of a hydraulic actuator. Note that the landing gear 1 may have only some of these cylinders.

(First Configuration Example of EHA System)

Figure 2:
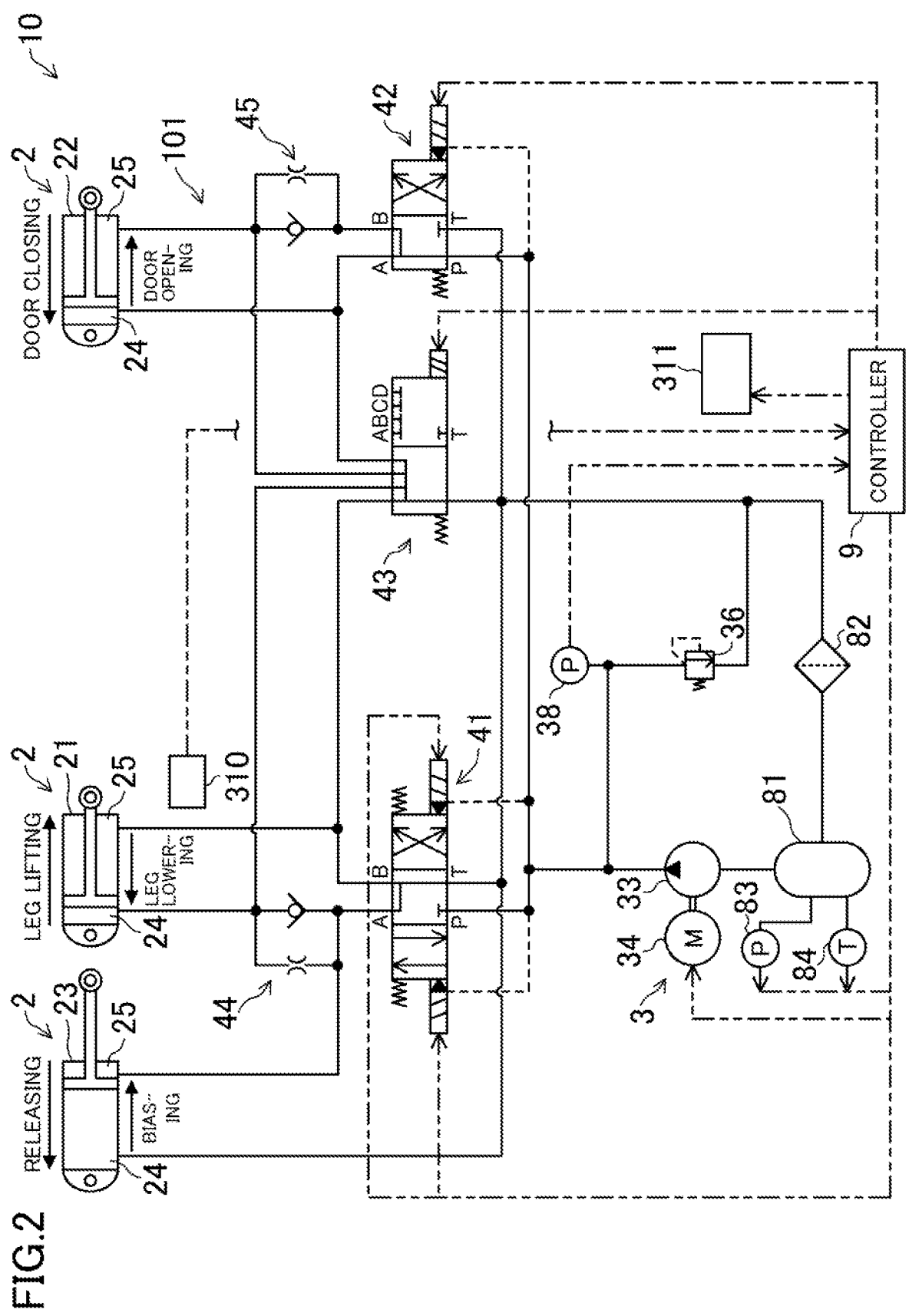
FIG. 2 is a circuit diagram showing, as an example, an EHA system for lifting or lowering a leg.

FIG. 2 is a circuit diagram showing a first configuration example of the EHA system for the landing gear 1. Note that in FIG. 2, a hydraulic path is indicated by a solid line, a pilot hydraulic path is indicated by a dashed line, and an electric signal path is indicated by a chain double-dashed line.

The EHA system 10 of the first configuration example includes a hydraulic circuit 101. The hydraulic circuit 101 includes a hydraulic actuator, an electric hydraulic pump, and the hydraulic path. The hydraulic path connects the hydraulic actuator and the electric hydraulic pump to each other.

The hydraulic actuator includes the gear cylinder 21, the door cylinder 22, and the down-lock release cylinder 23 as described above. The EHA system 10 may include the door up-lock release cylinder 26 and the gear up-lock release cylinder 27. Alternatively, the EHA system 10 may include only some of these cylinders 21, 22, 23, 26, 27. In description below, the gear cylinder 21, the door cylinder 22, and the down-lock release cylinder 23 will be collectively referred to as a hydraulic cylinder 2.

The hydraulic cylinder 2 has a bore-side fluid chamber 24 and an annulus-side fluid chamber 25. In the cylinder, a piston head separates the bore-side fluid chamber 24 and the annulus-side fluid chamber 25 from each other. Of the hydraulic cylinder 2, a first port communicates with the bore-side fluid chamber 24, and a second port communicates with the annulus-side fluid chamber 25. Hydraulic fluid flows into or out of the bore-side fluid chamber 24 through the first port, and flows into or out of the annulus-side fluid chamber 25 through the second port.

In the configuration example of FIG. 2, the gear cylinder 21 lifts the leg 11 against a load upon extension, and releases the load and lowers the leg 11 upon contraction. In the configuration example of FIG. 2, the door cylinder 22 releases a load and opens the door upon extension, and closes the door against the load upon contraction. In the configuration example of FIG. 2, a not-shown biasing member applies a load to the down-lock release cylinder 23 in an extending direction. By contraction, the down-lock release cylinder 23 releases the mechanism configured to fix the leg-lowered state. Note that the configurations of the gear cylinder 21, the door cylinder 22, and the down-lock release cylinder 23 are not limited to the above-described configurations.

The EHA system 10 includes the electric hydraulic pump 3. The electric hydraulic pump 3 supplies hydraulic fluid to each hydraulic cylinder 2.

The electric hydraulic pump 3 includes a single hydraulic pump 33 and a single electric motor 34. The hydraulic pump 33 and the electric motor 34 are coupled to each other. The hydraulic pump 33 is, in this configuration example, of a one-way rotation type which is rotatable only in one direction. The hydraulic pump 33 may be, for example, a gear pump. Note that the type of hydraulic pump 33 is not limited to above. The electric motor 34 is activated, operated, or stopped in response to a control signal from a later-described controller 9.

The hydraulic path downstream of the electric hydraulic pump 3 is branched. This branched path is connected to a reservoir tank 81 through a relief valve 36 and a filter 82.

The reservoir tank 81 absorbs fluctuation in the total volume of the bore-side fluid chamber 24 and the annulus-side fluid chamber 25 of the hydraulic cylinder 2 due to extension or contraction of the hydraulic cylinder 2. A suction port of the electric hydraulic pump 3 is connected to the reservoir tank 81.

Moreover, a first pressure sensor 83 is attached to the reservoir tank 81. The first pressure sensor 83 outputs, to the later-described controller 9, a measurement signal corresponding to the pressure of hydraulic fluid in the reservoir tank 81. The pressure based on the measurement signal of the first pressure sensor 83 is equivalent to the inlet pressure of the electric hydraulic pump 3.

A temperature sensor 84 is attached to the reservoir tank 81. The temperature sensor 84 outputs, to the controller 9, a measurement signal corresponding to the temperature of hydraulic fluid in the reservoir tank 81. The temperature of hydraulic fluid changes according to environment around the aircraft.

A second pressure sensor 38 is attached to the path branched from the electric hydraulic pump 3. The second pressure sensor 38 outputs, to the controller 9, a measurement signal corresponding to the discharge pressure (i.e., the outlet pressure) of the electric hydraulic pump 3. A difference between the pressure based on the second pressure sensor 38 and the pressure based on the first pressure sensor 83 is equivalent to a difference between the outlet pressure and the inlet pressure of the electric hydraulic pump 3.

A discharge port of the electric hydraulic pump 3 is connected to a gear selector valve 41 and a door selector valve 42.

The gear selector valve 41 is a four-port three-position switching valve having four ports including a P port, a T port, an A port, and a B port. The gear selector valve 41 selectively supplies hydraulic fluid to the gear cylinder 21 and the down-lock release cylinder 23. The P port is connected to the discharge port of the electric hydraulic pump 3. The T port is connected to the reservoir tank 81. The A port is connected to each of the bore-side fluid chamber 24 of the gear cylinder 21 and the annulus-side fluid chamber 25 of the down-lock release cylinder 23. The B port is connected to the annulus-side fluid chamber 25 of the gear cylinder 21. Note that the bore-side fluid chamber 24 of the down-lock release cylinder 23 is connected to the reservoir tank 81.

Moreover, the gear selector valve 41 is a hydraulic pilot solenoid valve. A spool receives a pilot hydraulic pressure. The spool is biased to a center position by a spring. The gear selector valve 41 causes, at the center position, each of the A port and the B port to communicate with the T port. At a first offset position (i.e., a position on the left side in FIG. 2), the gear selector valve 41 causes the A port and the P port to communicate with each other, and causes the B port and the T port to communicate with each other. At a second offset position (i.e., a position on the right side in FIG. 2), the gear selector valve 41 causes the A port and the T port to communicate with each other, and causes the B port and the T port to communicate with each other. By switching of the gear selector valve 41, the controller 9 selectively supplies hydraulic fluid to the bore-side fluid chamber 24 or the annulus-side fluid chamber 25 of the gear cylinder 21, and switches a supply of hydraulic fluid to the annulus-side fluid chamber 25 of the down-lock release cylinder 23 between a supply state and a stop state.

A speed control valve 44 is interposed between the A port of the gear selector valve 41 and the bore-side fluid chamber 24 of the gear cylinder 21. The speed control valve 44 is configured such that a check valve and an orifice are provided in parallel. The speed control valve 44 adjusts the speed of contraction of the gear cylinder 21.

The door selector valve 42 is a four-port two-position switching valve having four ports including a P port, a T port, an A port, and a B port. The door selector valve 42 selectively supplies hydraulic fluid to the door cylinder 22. The P port is connected to the discharge port of the electric hydraulic pump 3. The T port is connected to the reservoir tank 81. The A port is connected to the bore-side fluid chamber 24 of the door cylinder 22. The B port is connected to the annulus-side fluid chamber 25 of the door cylinder 22.

The door selector valve 42 is also a hydraulic pilot solenoid valve. A spool receives a pilot hydraulic pressure. The spool is biased to a normal position by a spring. The door selector valve 42 causes, at the normal position, each of the A port and the B port to communicate with the P port. At an offset position, the door selector valve 42 causes the A port and the T port to communicate with each other, and causes the B port and the P port to communicate with each other. By switching of the door selector valve 42, the controller 9 selectively supplies hydraulic fluid to the bore-side fluid chamber 24 or the annulus-side fluid chamber 25 of the door cylinder 22.

A speed control valve 45 is interposed between the B port of the door selector valve 42 and the annulus-side fluid chamber 25 of the door cylinder 22. The speed control valve 45 is configured such that a check valve and an orifice are provided in parallel. The speed control valve 45 adjusts the speed of extension of the door cylinder 22.

A dump valve 43 is interposed among the gear cylinder 21, the door cylinder 22, and the reservoir tank 81. The dump valve 43 is a five-port two-position switching valve having A, B, C, and D ports and a T port. The A port of the dump valve 43 is connected to the annulus-side fluid chamber 25 of the gear cylinder 21. The B port is connected to the bore-side fluid chamber 24 of the gear cylinder 21. The C port is connected to the annulus-side fluid chamber 25 of the door cylinder 22. The D port is connected to the bore-side fluid chamber 24 of the door cylinder 22. The T port is connected to the reservoir tank 81.

The dump valve 43 is a solenoid valve including a spool to be directly driven by a solenoid. The spool is biased to a normal position by a spring. At the normal position, the dump valve 43 causes all of the A, B, C, and D ports to communicate with the T port. At an offset position, the dump valve 43 disconnects each of the A to D ports from the T port. The controller 9 switches the dump valve 43.

A reference character 310 in FIG. 2 indicates a sensor configured to sense operation of the landing gear 1. The sensor 310 may be, for example, a limit switch attached to the gear cylinder 21. The limit switch outputs a signal to the controller 9 in each of a case where the gear cylinder 21 is in an extended state and a case where the gear cylinder 21 is in a contracted state.

A reference character 311 in FIG. 2 indicates a notification unit configured to notify a pilot or a mechanic of a later-described health monitoring result.

(Operation of EHA System in Leg Lifting)

Next, operation of the EHA system 10 in leg lifting will be described. When retracting the leg 11 in the airframe 12, the landing gear 1 performs an operation of opening the closed door, lifting the leg, and closing the door after completion of leg lifting. When deploying the leg 11 from the airframe 12, the landing gear 1 performs an operation of opening the closed door, lowering the leg, and closing the door after completion of leg lowering.

The controller 9 outputs a control signal to the electric hydraulic pump 3. The electric hydraulic pump 3 is activated, operated, or stopped in response to the control signal. The controller 9 also outputs control signals to the gear selector valve 41, the door selector valve 42, and the dump valve 43. The gear selector valve 41, the door selector valve 42, and the dump valve 43 switch the positions of the spools in response to the control signals. The controller 9 outputs the control signals to the electric hydraulic pump 3, the gear selector valve 41, the door selector valve 42, and the dump valve 43 so that the leg 11 can be retracted in the leg 11 or be deployed from the airframe 12. The controller 9 is an example of a control unit.

Figure 3:
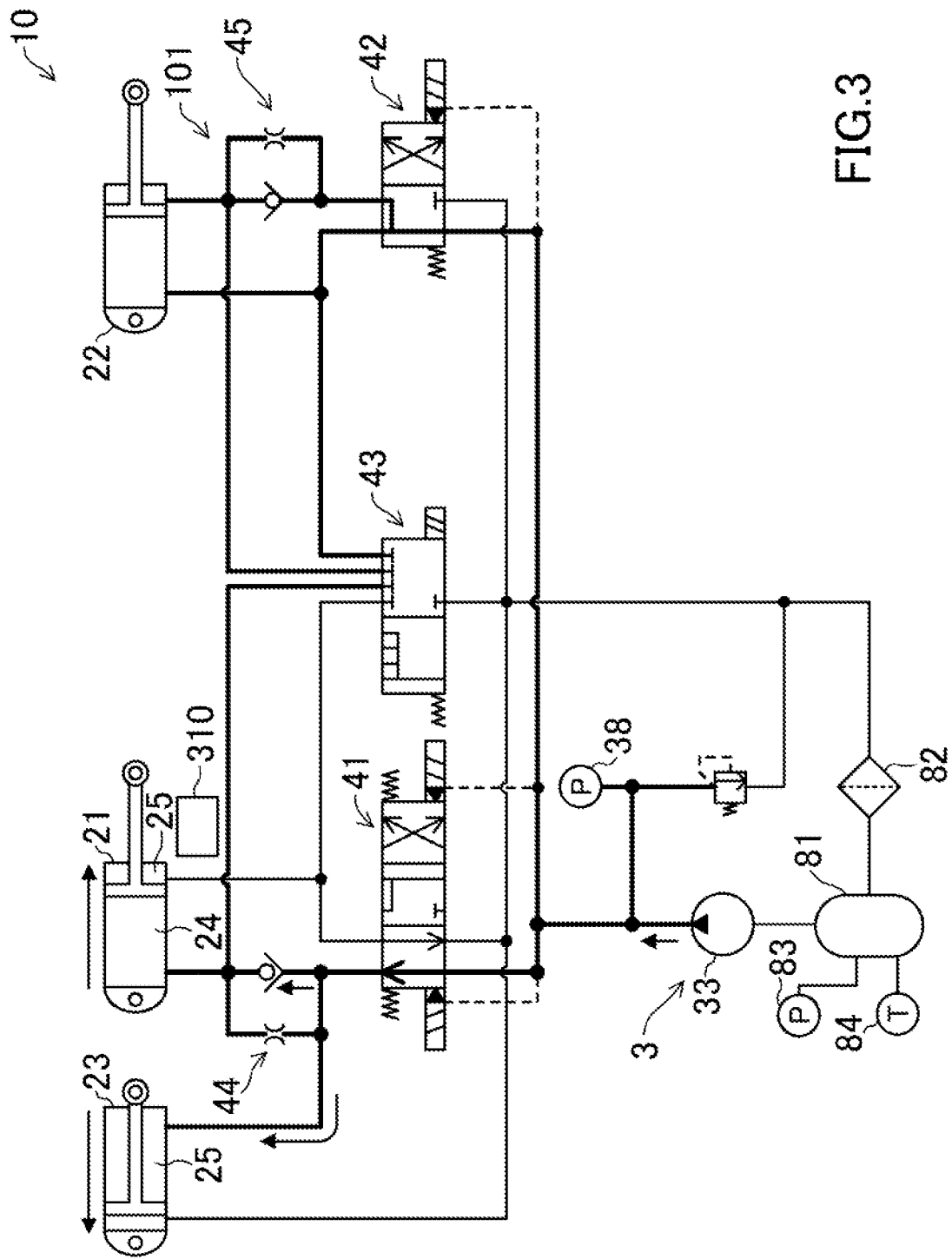
FIG. 3 is a diagram showing a state when the EHA system of FIG. 2 lifts the leg.

FIG. 3 shows operation of the EHA system 10 when the door is opened and the leg is lifted. Note that FIG. 3 does not show the controller 9, the electric motor 34, and the electric signal path. Moreover, in FIG. 3, the hydraulic path in which hydraulic fluid is supplied is indicated by a thick solid line, the pilot hydraulic path is indicated by a dashed line, and the hydraulic path connected to the reservoir tank 81 is indicated by a thin solid line.

The controller 9 switches the gear selector valve 41 to the first offset position. The A port and the P port of the gear selector valve 41 communicate with each other, and the B port and the T port of the gear selector valve 41 communicate with each other. Moreover, the controller 9 operates the electric hydraulic pump 3. The controller 9 feedback-controls the electric hydraulic pump 3 based on the measurement signal of the second pressure sensor 38. The discharge pressure of the electric hydraulic pump 3 is coincident with or substantially coincident with a target pressure.

As indicated by arrows in this figure, hydraulic fluid is supplied to the annulus-side fluid chamber 25 of the down-lock release cylinder 23 through the gear selector valve 41. The down-lock release cylinder 23 is contracted as indicated by an arrow in FIG. 3. The mechanism configured to fix the leg-lowered state is released. Moreover, hydraulic fluid is supplied to the bore-side fluid chamber 24 of the gear cylinder 21 through the gear selector valve 41. The gear cylinder 21 is extended as indicated by an arrow in FIG. 3. Accordingly, the leg 11 is lifted. Note that hydraulic fluid discharged from the annulus-side fluid chamber 25 by extension of the gear cylinder 21 returns to the reservoir tank 81 through the gear selector valve 41 and the filter 82. The controller 9 determines, based on a detection signal of the sensor 310, that leg lifting has been completed.

(Health Monitoring for Electric Hydraulic Pump)

Hereinafter, health monitoring for the electric hydraulic pump 3 by the EHA system 10 will be described. The EHA system 10 performs health monitoring regarding the performance of the electric hydraulic pump 3. More specifically, the EHA system 10 monitors the volumetric efficiency of the electric hydraulic pump 3.

The volumetric efficiency $\eta_v$ of the electric hydraulic pump 3 can be calculated according to Expression (2-1) below.

[Expression 5]

$$\eta_V = \frac{Q}{V_{th} \cdot \omega} \quad (2\text{-}1)$$

In this expression, Q is the actual discharge flow rate of the electric hydraulic pump 3. $V_{th}$ is the discharge flow rate (ideal) of the electric hydraulic pump 3 per rotation, and is a known value determined from the specifications of the electric hydraulic pump 3. $V_{th}$ is, for example, stored in a memory of the controller 9. $\omega$ is the speed of the electric hydraulic pump 3. $V_{th \cdot \omega}$ is the ideal discharge flow rate of the electric hydraulic pump 3. The speed of the electric hydraulic pump 3 can be, for example, calculated based on the control signal output from the controller 9 to the electric hydraulic pump 3.

The actual discharge flow rate Q of the electric hydraulic pump 3 is equivalent to a value obtained in such a manner that the leakage loss of the electric hydraulic pump 3 is subtracted from the ideal discharge flow rate of the electric hydraulic pump 3. The leakage loss of the electric hydraulic pump 3 increases due to breakdown or aging. As the leakage loss of the electric hydraulic pump 3 increases, the volumetric efficiency $\eta_v$ decreases. As the volumetric efficiency $\eta_v$ of the electric hydraulic pump 3 decreases, a time required for leg lifting or lowering increases. When the time required for leg lifting or lowering exceeds a preset limit time, the electric hydraulic pump 3 needs to be replaced or repaired. The volumetric efficiency $\eta_v$ of the electric hydraulic pump 3 is one of parameters indicating the performance of the electric hydraulic pump 3.

The actual discharge flow rate Q of the electric hydraulic pump 3 can be calculated according to Expression (2-2) below.

[Expression 6]

$$Q = V_{th} \cdot \omega - \alpha \frac{\Delta P}{T} \quad (2\text{-}2)$$

$\Delta P$ is the difference between the outlet pressure and the inlet pressure of the electric hydraulic pump 3. T is the temperature of hydraulic fluid. $\alpha$ is a coefficient regarding leakage inside the electric hydraulic pump 3, and is an unknown value.

Moreover, the actual discharge flow rate Q of the electric hydraulic pump 3 can be represented by Expression (2-3) below by means of a hydraulic fluid amount $V_{act}$ required for operation of the hydraulic cylinder 2.

[Expression 7]

$$V_{act} = \int_0^{t1} Q dt = \int_0^{t1} \left( V_{th} \cdot \omega - \alpha \frac{\Delta P}{T} \right) dt \quad (2\text{-}3)$$

In this expression, t1 is a time until completion after the start of operation of the hydraulic cylinder 2, i.e., a time until stop after the start of operation of the electric hydraulic pump 3.

The hydraulic fluid amount $V_{act}$ required for operation of the hydraulic cylinder 2 is fixed from the volume of the hydraulic cylinder 2. The hydraulic cylinder 2 may be, for example, the gear cylinder 21. The hydraulic fluid amount $V_{act}$ required for operation of the hydraulic cylinder 2 may be a hydraulic fluid amount required for the gear cylinder 21 for lifting the leg. The hydraulic fluid amount $V_{act}$ is, for example, stored in the memory of the controller 9.

The first pressure sensor 83 outputs the measurement signal corresponding to the inlet pressure of the electric hydraulic pump 3. The second pressure sensor 38 outputs the measurement signal corresponding to the outlet pressure of the electric hydraulic pump 3. The first pressure sensor 83 outputs the measurement signal corresponding to the temperature of hydraulic fluid.

Based on the measurement signals of the first pressure sensor 83, the second pressure sensor 38, and the temperature sensor 84 and the time t1 required for leg lifting during leg lifting by the gear cylinder 21 by a supply of hydraulic fluid from the electric hydraulic pump 3, the controller 9 performs arithmetic operation according to Expressions (2-1) to (2-3) above, thereby calculating the volumetric efficiency $\eta_v$ of the electric hydraulic pump 3.

For example, when the calculated volumetric efficiency $\eta_v$ falls below a preset limit value, the controller 9 notifies the pilot and/or the mechanic of the aircraft of such a situation through the notification unit 311. Accordingly, an administrator of the aircraft can predict a timing of requiring replacement or repairment of the electric hydraulic pump 3.

The controller 9 may make a notification through the notification unit 311 based on the history of a change in the calculated volumetric efficiency $\eta_v$. The history of the change in the volumetric efficiency $\eta_v$ indicates the speed of progression of deterioration of the electric hydraulic pump 3. Based on the speed of progression of deterioration of the electric hydraulic pump 3, the administrator of the aircraft can more accurately predict the timing of requiring replacement or repairment of the electric hydraulic pump 3.

Note that health monitoring using leg lifting by the gear cylinder 21 has been described as an example, but the controller 9 may also perform health monitoring for the electric hydraulic pump 3 by means of operation of the door cylinder 22 or operation of the down-lock release cylinder 23.

Figure 4:
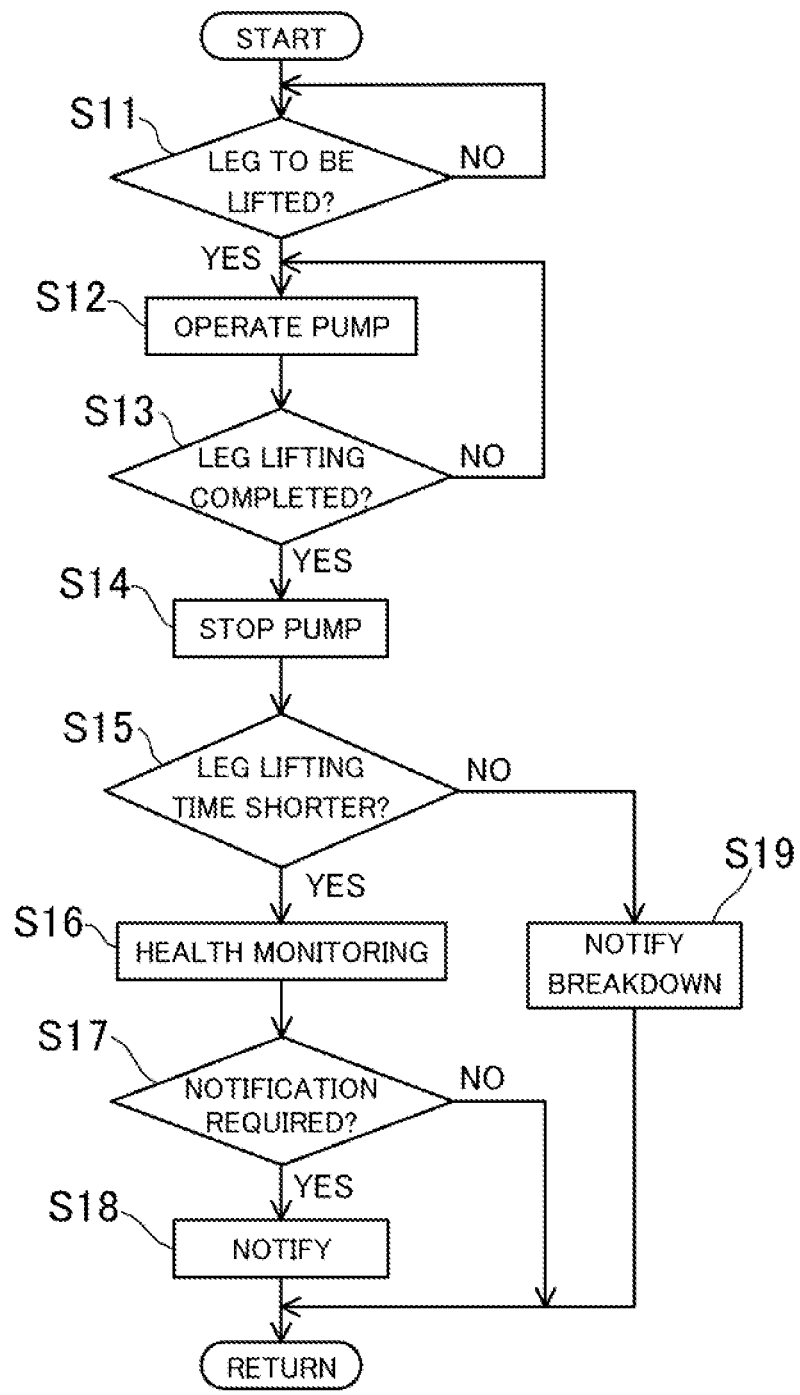
FIG. 4 is a flowchart regarding health monitoring for an electric hydraulic pump in the EHA system of FIG. 2.

FIG. 4 shows, as an example, a flowchart regarding health monitoring for the electric hydraulic pump 3 by the controller 9. First, in Step S11 after start, the controller 9 determines whether or not the leg is to be lifted. In the case of NO in determination in Step S11, Step S11 is repeated in the process. In the case of YES in determination in Step S11, the process proceeds to Step S12.

In Step S12, the controller 9 starts operation of the electric hydraulic pump 3. Hydraulic fluid is supplied to the gear cylinder 21, and the leg 11 is lifted accordingly. In Step S13, the controller 9 determines, based on the detection signal of the sensor 310, whether or not leg lifting has been completed. In the case of NO in determination in Step S13, the process returns to Step S12, and operation of the electric hydraulic pump 3 is continued. In the case of YES in determination in Step S13, the process proceeds to Step S14, and the controller 9 stops operation of the electric hydraulic pump 3. The controller 9 measures the time t1 required for leg lifting from Step S12 to Step S14. Moreover, the controller 9 stores the difference $\Delta P$ between the outlet pressure and the inlet pressure of the electric hydraulic pump 3 based on the measurement signals of the first pressure sensor 83 and the second pressure sensor 38, the temperature T of hydraulic fluid based on the measurement signal of the temperature sensor 84, and the speed $\omega$ of the electric hydraulic pump 3.

In Step S15, the controller 9 determines whether or not the time t1 required for leg lifting is within the preset limit time, i.e., whether or not the time t1 required for leg lifting is shorter. In a case where the time required for leg lifting is within the limit time, the process proceeds to Step S16. In a case where the time required for leg lifting exceeds the limit time, the process proceeds to Step S19.

In Step S19, the controller 9 determines that the electric hydraulic pump 3 has been broken down. The controller 9 notifies the pilot of breakdown of the electric hydraulic pump 3 through, e.g., the notification unit 311.

In Step S16, the controller 9 executes health monitoring for the electric hydraulic pump 3. Specifically, based on the difference $\Delta P$ between the outlet pressure and the inlet pressure of the electric hydraulic pump 3, the temperature T of hydraulic fluid, and the speed ($\omega$) of the electric hydraulic pump 3 measured in leg lifting and the time t1 required for leg lifting, the volumetric efficiency $\eta_v$ of the electric hydraulic pump 3 is calculated according to Expressions (2-1) to (2-3).

Subsequently, in Step S17, the controller 9 determines, based on the calculated volumetric efficiency $\eta_v$, whether or not a notification needs to be made. In a case where it is determined that the notification needs to be made, the process proceeds to Step S18, and the controller 9 makes the notification through the notification unit 311. In a case where it is determined that the notification does not need to be made, the process returns without proceeding to Step S18.

As described above, the EHA system 10 performs health monitoring for the electric hydraulic pump 3. Based on the health monitoring result, the administrator of the aircraft can predict the timing of requiring replacement or repairment of the electric hydraulic pump 3. Since the timing of requiring replacement or repairment of the electric hydraulic pump 3 can be predicted, the administrator of the aircraft can determine, in advance, a timing of stopping use of the aircraft for replacement or repairment of the electric hydraulic pump 3. The aircraft equipped with the EHA system 10 can perform health monitoring for the electric hydraulic pump 3, and therefore, influence on an operation schedule can be reduced to the minimum.

The EHA system 10 diagnoses breakdown of the electric hydraulic pump 3 in addition to health monitoring for the electric hydraulic pump 3. With this configuration, the administrator of the aircraft can execute replacement or repairment of the electric hydraulic pump 3 at a proper timing.

Even without attaching a flow rate sensor configured to measure the actual discharge flow rate of the electric hydraulic pump 3 to the hydraulic circuit 101, the controller 9 can calculate the volumetric efficiency of the electric hydraulic pump 3 by means of the first pressure sensor 83, the second pressure sensor 38, and the temperature sensor 84 used for, e.g., feedback control of the electric hydraulic pump 3. The configuration of the EHA system 10 is simplified. Moreover, since the additional sensor is not attached, degradation of the reliability of the EHA system 10 can be reduced.

(Second Configuration Example of EHA System)

Figure 5:
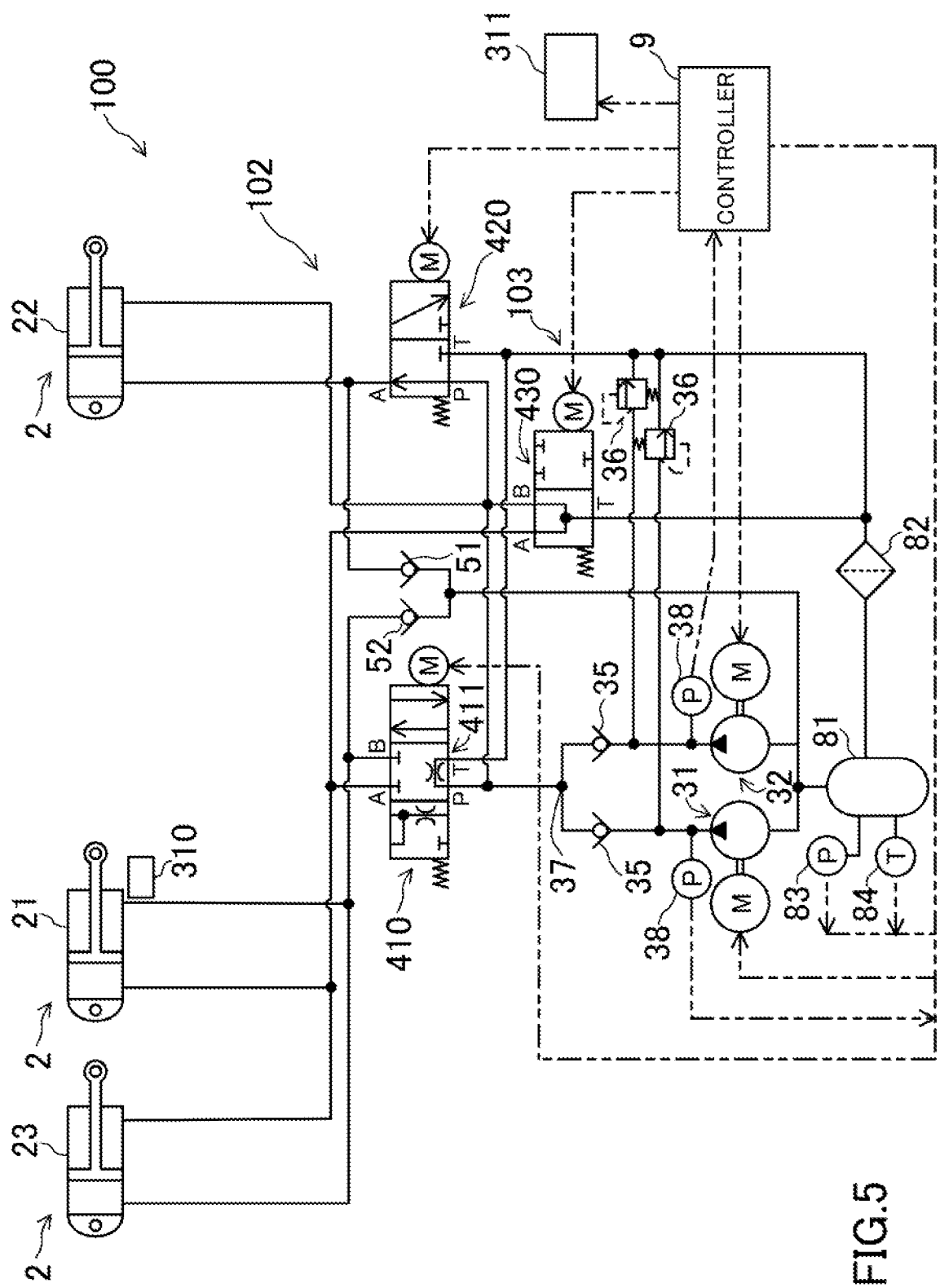
FIG. 5 is a circuit diagram of an EHA system having a configuration different from that of FIG. 2.

FIG. 5 shows a circuit diagram of an EHA system 100 having a configuration different from that of FIG. 2. Note that in FIG. 5, a hydraulic path is indicated by a solid line and an electric signal path is indicated by a chain double-dashed line. In the EHA system 100 of FIG. 5, the same reference characters are used to represent the same components as those of the EHA system 10 of FIG. 2. The EHA system 100 includes a hydraulic circuit 102.

The EHA system 100 of FIG. 5 has two pumps including a first electric hydraulic pump 31 and a second electric hydraulic pump 32. The first electric hydraulic pump 31 and the second electric hydraulic pump 32 are provided in parallel with hydraulic cylinders 2. Each of the first electric hydraulic pump 31 and the second electric hydraulic pump 32 supplies hydraulic fluid to each hydraulic cylinder 2. Each electric hydraulic pump includes a single hydraulic pump and a single electric motor.

In the case of supplying hydraulic fluid to each hydraulic cylinder 2, a controller 9 operates both the first electric hydraulic pump 31 and the second electric hydraulic pump 32. In a case where the first electric hydraulic pump 31 is failed, the controller 9 operates only the second electric hydraulic pump 32. In a case where the second electric hydraulic pump 32 is failed, the controller 9 operates only the first electric hydraulic pump 31. The EHA system 100 is redundant because the first electric hydraulic pump 31 and the second electric hydraulic pump 32 are provided in parallel with each hydraulic cylinder 2. Thus, in the EHA system 100, hydraulic fluid can be supplied to each hydraulic cylinder 2 only by the single electric hydraulic pump.

A check valve 35 is arranged between a merging portion 37 between the first electric hydraulic pump 31 and the second electric hydraulic pump 32 and the first electric hydraulic pump 31. A check valve 35 is also arranged between the merging portion 37 and the second electric hydraulic pump 32. In a case where one of the first and second electric hydraulic pumps 31, 32 is stopped, these check valves 35 stops hydraulic fluid discharged from the other electric hydraulic pump from flowing back to the stopped electric hydraulic pump.

A second pressure sensor 38 is provided between the first electric hydraulic pump 31 and the check valve 35, and another second pressure sensor 38 is provided between the second electric hydraulic pump 32 and the check valve 35. These two second pressure sensors 38 output measurement signals corresponding to the discharge pressures of the first electric hydraulic pump 31 and the second electric hydraulic pump 32.

The merging portion 37 is connected to a gear selector valve 410 and a door selector valve 420.

The gear selector valve 410 is a four-port three-position switching valve having four ports including a P port, a T port, an A port, and a B port. The gear selector valve 410 selectively supplies hydraulic fluid to a gear cylinder 21 and a down-lock release cylinder 23. The P port is connected to the merging portion 37. The T port is connected to a reservoir tank 81. The A port is connected to each of a bore-side fluid chamber of the gear cylinder 21 and an annulus-side fluid chamber of the down-lock release cylinder 23. The B port is connected to each of an annulus-side fluid chamber of the gear cylinder 21 and a bore-side fluid chamber of the down-lock release cylinder 23.

The gear selector valve 410 is driven by a motor. The controller 9 controls operation of the motor. At a center position, the gear selector valve 410 causes the P port and the T port to communicate with each other. The gear selector valve 410 has an orifice 411. The P port and the T port communicate with each other through the orifice 411. In the case of performing warm-up operation of the EHA system 100 as described later, the gear selector valve 410 is at the center position. The orifice 411 is included in a later-described warm-up circuit 103. The orifice 411 increases the temperature of hydraulic fluid circulating in the warm-up circuit 103.

At a first offset position (i.e., a position on the left side in FIG. 5), the gear selector valve 410 causes the A port and the B port to communicate with the T port. The A and B ports and the T port communicate with each other through a second orifice. The gear selector valve 410 is at the first offset position in leg lowering. At a second offset position (i.e., a position on the right side in FIG. 5), the gear selector valve 410 causes the A port and the P port to communicate with each other, and causes the B port and the T port to communicate with each other. The gear selector valve 410 is at the second offset position in leg lifting.

By switching of the gear selector valve 410, the controller 9 selectively supplies hydraulic fluid to the bore-side fluid chamber or the annulus-side fluid chamber of the gear cylinder 21, and selectively supplies hydraulic fluid to the bore-side fluid chamber or the annulus-side fluid chamber of the down-lock release cylinder 23.

The door selector valve 420 is a three-port two-position switching valve having three ports including a P port, a T port, and an A port. The door selector valve 420 selectively supplies hydraulic fluid to the door cylinder 22. The P port is connected to the merging portion 37. The T port is connected to the reservoir tank 81. The A port is connected to a bore-side fluid chamber of the door cylinder 22.

The door selector valve 420 is also driven by a motor. The controller 9 controls operation of the motor. At a normal position, the door selector valve 420 causes the A port and the P port to communicate with each other. At an offset position, the door selector valve 420 causes the A port and the T port to communicate with each other. The door selector valve 420 is at the normal position in door opening. The door selector valve 420 is at the offset position in door closing. By switching of the door selector valve 420, the controller 9 selectively supplies hydraulic fluid to the bore-side fluid chamber or an annulus-side fluid chamber of the door cylinder 22.

A dump valve 430 is interposed among the gear cylinder 21, the door cylinder 22, the down-lock release cylinder 23, and the reservoir tank 81. The dump valve 430 is a three-port two-position switching valve having A and B ports and a T port.

The A port of the dump valve 430 is connected to the bore-side fluid chamber of the gear cylinder 21 and the annulus-side fluid chamber of the down-lock release cylinder 23.

The B port is connected to the annulus-side fluid chamber of the door cylinder 22. The B port is also connected to the P port of the gear selector valve 410, and is connected to the P port of the door selector valve 420. The T port is connected to the reservoir tank 81.

A check valve 51 is provided among the bore-side fluid chamber of the door cylinder 22, a suction port of the first electric hydraulic pump 31, and a suction port of the second electric hydraulic pump 32. Similarly, a check valve 52 is provided among the annulus-side fluid chamber of the gear cylinder 21, the bore-side fluid chamber of the down-lock release cylinder 23, the suction port of the first electric hydraulic pump 31, and the suction port of the second electric hydraulic pump 32.

Operation of the EHA system 100 will be briefly described herein. The controller 9 outputs control signals to the first electric hydraulic pump 31 and the second electric hydraulic pump 32. The first electric hydraulic pump 31 and the second electric hydraulic pump 32 are activated, operated, or stopped in response to the control signals. Moreover, the controller 9 outputs control signals to the gear selector valve 410, the door selector valve 420, and the dump valve 430. The gear selector valve 410, the door selector valve 420, and the dump valve 430 switch spool positions in response to the control signals. The controller 9 outputs the control signals to the first electric hydraulic pump 31, the second electric hydraulic pump 32, the gear selector valve 410, the door selector valve 420, and the dump valve 430, thereby retracting a leg 11 in an airframe 12 or deploying the leg 11 from the airframe 12.

For example, when opening a door and lifting the leg, the controller 9 switches the gear selector valve 410 to the second offset position. Of the gear selector valve 410, the A port and the P port communicate with each other, and the B port and the T port communicate with each other. Moreover, the controller 9 operates the first electric hydraulic pump 31 and the second electric hydraulic pump 32.

Although not shown in the figure, hydraulic fluid is supplied to the annulus-side fluid chamber of the down-lock release cylinder 23 through the gear selector valve 410. The down-lock release cylinder 23 is contracted. A mechanism configured to fix a leg-lowered state is released. Moreover, hydraulic fluid is supplied to the bore-side fluid chamber of the gear cylinder 21. The gear cylinder 21 is extended. Accordingly, the leg 11 is lifted.

(Warm-Up Operation of EHA System)

An aircraft takes off from a region under a low air temperature, or lands a region under a low air temperature. When a temperature around the EHA system mounted on the aircraft is low, the temperature of hydraulic fluid decreases. As the temperature of hydraulic fluid decreases, the viscosity of hydraulic fluid greatly changes.

For this reason, the EHA system 100 performs the warm-up operation for increasing the temperature of hydraulic fluid when the ambient temperature is low. The EHA system 100 includes the warm-up circuit 103.

Figure 6:
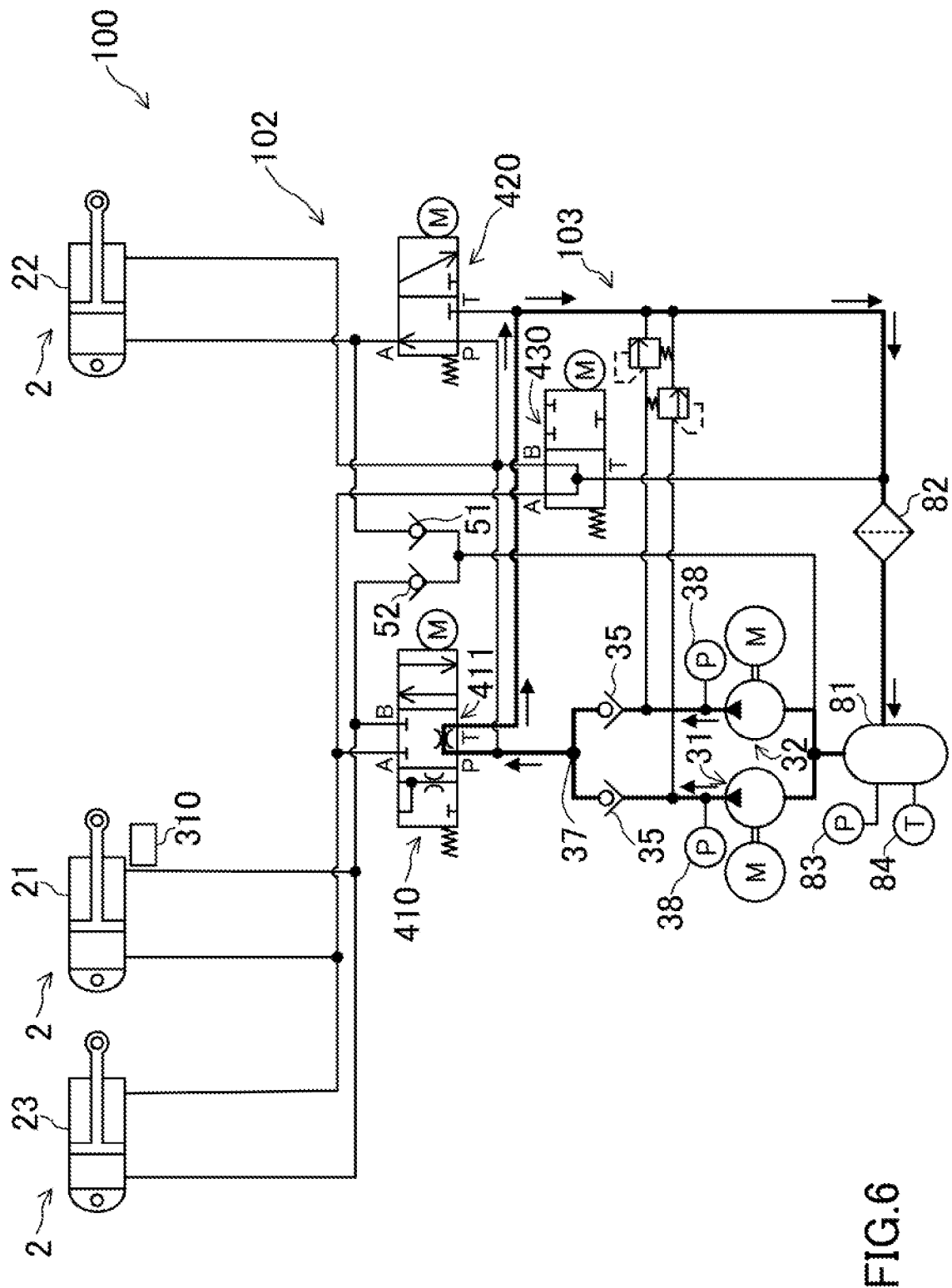
FIG. 6 is a diagram showing a state in which the EHA system of FIG. 5 performs warm-up operation.

FIG. 6 shows a state in which the EHA system 100 performs the warm-up operation. Note that FIG. 6 does not show the controller 9 and the electric signal path. When performing the warm-up operation, the controller 9 switches the gear selector valve 410 to the center position. The P port and the T port of the gear selector valve 410 communicate with each other through the orifice 411. Accordingly, the warm-up circuit 103 is formed as indicated by a thick solid line in FIG. 6.

The controller 9 operates both the first electric hydraulic pump 31 and the second electric hydraulic pump 32, and accordingly, hydraulic fluid discharged from the first electric hydraulic pump 31 and the second electric hydraulic pump 32 returns to the reservoir tank 81 with bypassing each hydraulic cylinder 2. Hydraulic fluid circulates in the warm-up circuit 103 including the orifice 411, and accordingly, the temperature of hydraulic fluid gradually increases. When the temperature of hydraulic fluid has increased to a preset temperature, the controller 9 ends the warm-up operation.

(Health Monitoring for Electric Hydraulic Pumps)

The EHA system 100 includes the first electric hydraulic pump 31 and the second electric hydraulic pump 32. In the case of supplying hydraulic fluid to each hydraulic cylinder 2, both the first electric hydraulic pump 31 and the second electric hydraulic pump 32 are operated. For example, in a state in which both the first electric hydraulic pump 31 and the second electric hydraulic pump 32 are operated, when an attempt is made to calculate the actual discharge flow rate of the first electric hydraulic pump 31 and the actual discharge flow rate of the second electric hydraulic pump 32 when hydraulic fluid is supplied to each hydraulic cylinder 2, it is difficult to separately calculate these two discharge flow rates.

For this reason, in the EHA system 100, the controller 9 performs health monitoring for each of the first electric hydraulic pump 31 and the second electric hydraulic pump 32 by means of the warm-up circuit 103.

Specifically, the controller 9 operates only the first electric hydraulic pump 31 before leg lifting or lowering and after the end of the warm-up operation, for example. Accordingly, hydraulic fluid discharged from the first electric hydraulic pump 31 returns to the reservoir tank 81 after having passed through the orifice 411, as described above. At this point, hydraulic fluid bypasses each hydraulic cylinder 2, and therefore, a hydraulic fluid amount $V_{act}$ required for operation of the hydraulic cylinder 2 cannot be used for calculation of the actual discharge flow rate Q of the first electric hydraulic pump 31.

However, in a case where hydraulic fluid circulates in the warm-up circuit 103, the actual discharge flow rate Q of the first electric hydraulic pump 31 is equal to or substantially equal to the flow rate $Q_{ori}$ of hydraulic fluid passing through the orifice 411. Thus, the controller 9 calculates the actual discharge flow rate Q of the first electric hydraulic pump 31 by means of the flow rate $Q_{ori}$ of hydraulic fluid passing through the orifice 411.

The flow rate $Q_{ori}$ of hydraulic fluid passing through the orifice 411 can be calculated according to Expression (2-4) below.

[Expression 8]

$$Q_{ori} = C_D \cdot A \sqrt{\frac{2\Delta P}{\rho}} \qquad (2\text{-}4)$$

In this expression, $C_D$ is the flow coefficient of the orifice 411. A is the passage area of the orifice 411. $\rho$ is the density of hydraulic fluid, and the density of hydraulic fluid is the function of the temperature of hydraulic fluid. The density $\rho$ of hydraulic fluid can be acquired based on a measurement signal of a temperature sensor 84. $\Delta P$ is a pressure difference between upstream and downstream sides of the orifice 411. In the warm-up circuit 103, the upstream pressure of the orifice 411 is equivalent to the discharge pressure of the first electric hydraulic pump 31 or the second electric hydraulic pump 32. The downstream pressure of the orifice 411 is equivalent to the pressure of the reservoir tank 81. Thus, the pressure difference $\Delta P$ can be acquired based on the measurement signals of the two second pressure sensors 38 and a measurement signal of a first pressure sensor 83.

The controller 9 can calculate the actual discharge flow rate Q of the first electric hydraulic pump 31, assuming that the actual discharge flow rate Q of the first electric hydraulic pump 31 calculated according to Expression (2-2) above is equal to the flow rate $Q_{ori}$ of hydraulic fluid passing through the orifice 411 as calculated according to Expression (2-4) above. Then, the controller 9 can calculate the volumetric efficiency $\eta_v$ of the first electric hydraulic pump 31 according to Expression (2-1).

After having calculated the volumetric efficiency $\eta_v$ of the first electric hydraulic pump 31, the controller 9 stops the first electric hydraulic pump 31, and subsequently operates only the second electric hydraulic pump 32.

In a manner similar to that described above, the controller 9 can calculate the actual discharge flow rate Q of the second electric hydraulic pump 32, assuming that the actual discharge flow rate Q of the second electric hydraulic pump 32 calculated according to Expression (2-2) above is equal to the flow rate $Q_{ori}$ of hydraulic fluid passing through the orifice 411 as calculated according to Expression (2-4) above. Then, the controller 9 can calculate the volumetric efficiency $\eta_v$ of the second electric hydraulic pump 32 according to Expression (2-1).

In this manner, the controller 9 can calculate, in the EHA system 100, the volumetric efficiency $\eta_v$ of each of the first electric hydraulic pump 31 and the second electric hydraulic pump 32.

Figure 7:
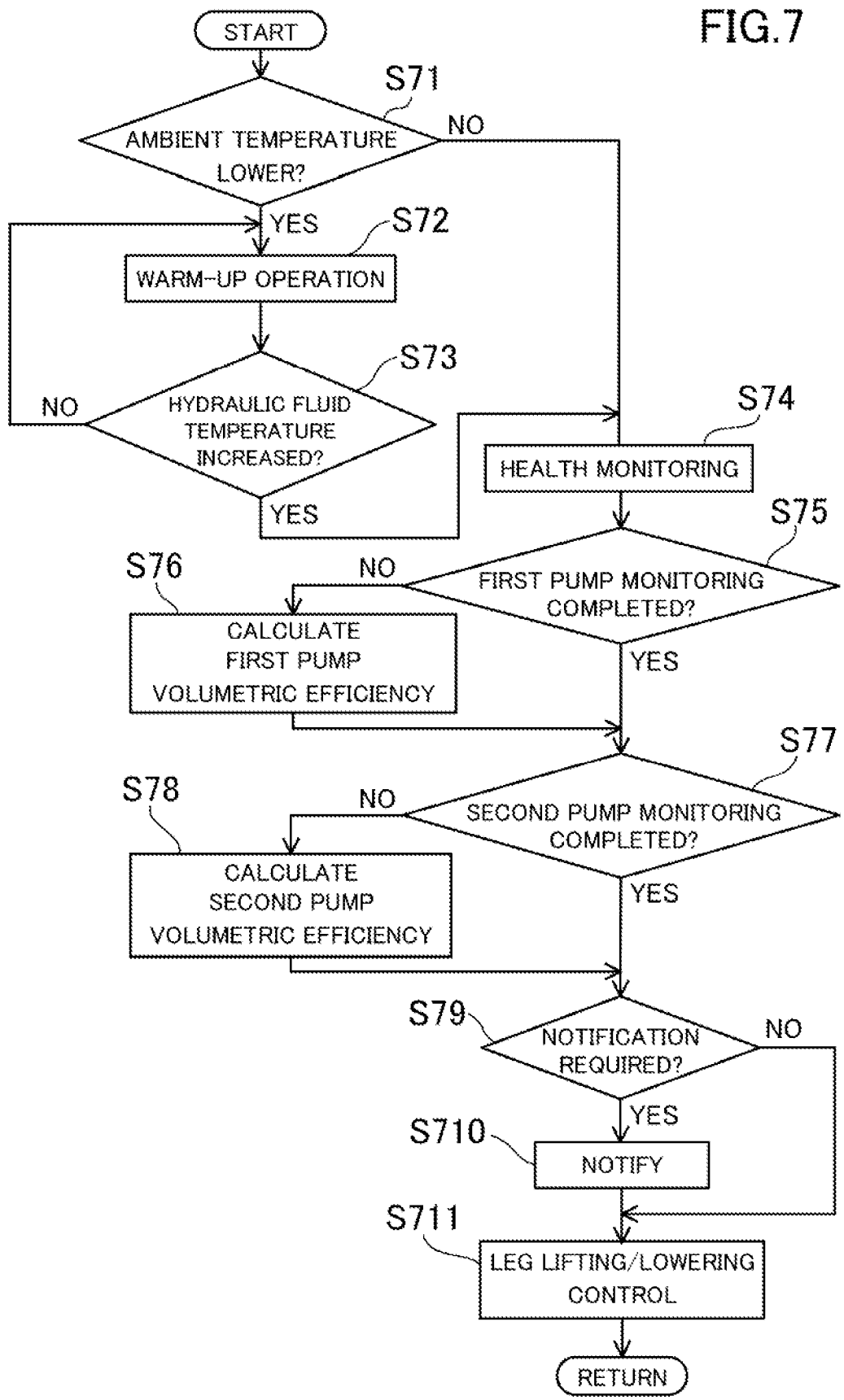
FIG. 7 is a flowchart regarding health monitoring for an electric hydraulic pump in the EHA system of FIG. 5.

FIG. 7 shows, as an example, a flowchart regarding health monitoring for the first electric hydraulic pump 31 and the second electric hydraulic pump 32 by the controller 9 in the EHA system 100. First, in Step S71 after start, the controller 9 determines whether or not the ambient temperature is lower than the predetermined temperature. In the case of YES in determination in Step S71, the process proceeds to Step S72. In the case of NO in determination in Step S71, the process proceeds to Step S74.

In Step S72, the controller 9 performs, as described above, the warm-up operation of the EHA system 100. Subsequently, in Step S73, the controller 9 determines, based on the measurement signal of the temperature sensor 84, whether or not the temperature of hydraulic fluid has increased to the predetermined temperature. In the case of NO in determination in Step S73, the process returns to Step S72, and the controller 9 continuously performs the warm-up operation of the EHA system 100. On the other hand, in the case of YES in determination in Step S73, the process proceeds to Step S74.

In Step S74, the controller 9 performs health monitoring for the first electric hydraulic pump 31 and the second electric hydraulic pump 32. Even in the case of not performing the warm-up operation, the controller 9 performs, before leg lifting control, health monitoring for the first electric hydraulic pump 31 and the second electric hydraulic pump 32 by means of the warm-up circuit 103.

First, in Step S75, the controller 9 determines whether or not health monitoring for the first electric hydraulic pump 31 has been completed. In the case of YES in determination in Step S75, the process proceeds to Step S77. On the other hand, in the case of NO in determination in Step S75, the process proceeds to Step S76.

In Step S76, the controller 9 operates, according to the above-described steps, only the first electric hydraulic pump 31, and calculates the volumetric efficiency $\eta_v$ of the first electric hydraulic pump 31. Thereafter, the process proceeds to Step S77.

In Step S77, the controller 9 determines whether or not health monitoring for the second electric hydraulic pump 32 has been completed. In the case of YES in determination in Step S77, the process proceeds to Step S79. On the other hand, in the case of NO in determination in Step S77, the process proceeds to Step S78.

In Step S78, the controller 9 operates, according to the above-described steps, only the second electric hydraulic pump 32, and calculates the volumetric efficiency $\eta_v$ of the second electric hydraulic pump 32. Thereafter, the process proceeds to Step S79.

In Step S79, the controller 9 determines, based on the calculated volumetric efficiencies $\eta_v$, whether or not a notification needs to be made. In a case where it is determined that the notification needs to be made, the process proceeds to Step S710, the controller 9 makes the notification through a notification unit 311. In a case where it is determined that the notification does not need to be made, the process proceeds to Step S711 without proceeding to Step S710.

In Step S711, the controller 9 performs the leg lifting/lowering control. The leg is lifted or lowered.

As described above, the EHA system 100 also performs health monitoring for the first electric hydraulic pump 31 and the second electric hydraulic pump 32. Based on such a health monitoring result, an administrator of the aircraft can predict a timing of requiring replacement or repairment of the first electric hydraulic pump 31 and/or the second electric hydraulic pump 32. The aircraft equipped with the EHA system 100 can reduce influence on an operation schedule to the minimum.

For the EHA system 100, electric flow rate sensors for measuring the actual discharge flow rates of the first electric hydraulic pump 31 and the second electric hydraulic pump 32 are not required. The configuration of the EHA system 100 is simplified. Moreover, since the additional sensors are not attached, degradation of the reliability of the EHA system 100 can be reduced.

Since health monitoring is performed after the warm-up operation, the controller 9 can perform health monitoring with the hydraulic fluid temperature increased. The accuracy of health monitoring is improved.

Note that the EHA systems 10, 100 shown in FIGS. 2 and 5 are examples. An optional circuit configuration can be employed as the circuit forming the EHA system for lifting or lowering the leg.

The invention claimed is:

1. An electro hydrostatic actuator (EHA) system for lifting or lowering a leg of an aircraft, comprising:
a hydraulic circuit including a hydraulic actuator attached to the leg to lift or lower the leg, at least one electric hydraulic pump configured to discharge hydraulic fluid supplied to the hydraulic actuator, and a hydraulic path connecting the hydraulic actuator and the electric hydraulic pump to each other;
a pressure sensor configured to output a measurement signal corresponding to a pressure of the hydraulic fluid in the hydraulic circuit during operation of the electric hydraulic pump;
a temperature sensor configured to output a measurement signal corresponding to a temperature of the hydraulic fluid; and
a control unit configured to output a control signal for operating the electric hydraulic pump to the electric hydraulic pump,
wherein:
the hydraulic circuit includes a pressure increasing element configured to increase the pressure of the hydraulic fluid discharged from the electric hydraulic pump,
the control unit performs health monitoring regarding performance of the electric hydraulic pump based on the pressure of the hydraulic fluid based on the measurement signal of the pressure sensor, the temperature of the hydraulic fluid based on the measurement signal of the temperature sensor, and a speed of the electric hydraulic pump during operation of the electric hydraulic pump,
the pressure increasing element is the hydraulic actuator, and
the control unit:
calculates an actual discharge flow rate of the electric hydraulic pump based on the pressure of the hydraulic fluid, the temperature of the hydraulic fluid, and the speed of the electric hydraulic pump during leg lifting by the hydraulic actuator, a time required for the leg lifting by the hydraulic actuator, and an amount of the hydraulic fluid required for the leg lifting by the hydraulic actuator, and
calculates a volumetric efficiency of the electric hydraulic pump from the calculated actual discharge flow rate and an ideal discharge flow rate of the electric hydraulic pump determined from the speed of the electric hydraulic pump.

2. The EHA system for lifting or lowering the leg according to claim 1, wherein the hydraulic actuator is an extendable hydraulic cylinder.

3. The EHA system for lifting or lowering the leg according to claim 1, further comprising:
a notification unit configured to notify a result of the health monitoring for the electric hydraulic pump in response to a control signal from the control unit.

4. The EHA system for lifting or lowering the leg according to claim 1, wherein the control unit determines that the electric hydraulic pump is broken down in a case where a time until completion after start of the leg lifting exceeds a preset limit time.

5. An electro hydrostatic actuator (EHA) system for lifting or lowering a leg of an aircraft, the EHA system comprising:
a hydraulic circuit including a hydraulic actuator attached to the leg to lift or lower the leg, at least one electric hydraulic pump configured to discharge hydraulic fluid supplied to the hydraulic actuator, and a hydraulic path connecting the hydraulic actuator and the electric hydraulic pump to each other;
a pressure sensor configured to output a measurement signal corresponding to a pressure of the hydraulic fluid in the hydraulic circuit during operation of the electric hydraulic pump;
a temperature sensor configured to output a measurement signal corresponding to a temperature of the hydraulic fluid; and
a control unit configured to output a control signal for operating the electric hydraulic pump to the electric hydraulic pump,
wherein:
the hydraulic circuit includes a pressure increasing element configured to increase the pressure of the hydraulic fluid discharged from the electric hydraulic pump,
the control unit performs health monitoring regarding performance of the electric hydraulic pump based on the pressure of the hydraulic fluid based on the measurement signal of the pressure sensor, the temperature of the hydraulic fluid based on the measurement signal of the temperature sensor, and a speed of the electric hydraulic pump during operation of the electric hydraulic pump,
the hydraulic circuit includes a warm-up circuit in which the hydraulic fluid circulates with bypassing the hydraulic actuator,
the pressure increasing element is a restrictor provided in a middle of the warm-up circuit and configured to increase the temperature of the hydraulic fluid, and
the control unit:
calculates the actual discharge flow rate of the electric hydraulic pump based on a flow rate, which is determined from the pressure of the hydraulic fluid and the temperature of the hydraulic fluid, of the hydraulic fluid passing through the restrictor during circulation of the hydraulic fluid in the warm-up circuit, and
calculates the volumetric efficiency of the electric hydraulic pump from the calculated actual discharge flow rate and the ideal discharge flow rate of the electric hydraulic pump determined from the speed of the electric hydraulic pump.

6. The EHA system for lifting or lowering the leg according to claim 5, wherein:
the electric hydraulic pump includes a first electric hydraulic pump and a second electric hydraulic pump,
the first electric hydraulic pump and the second electric hydraulic pump are connected in parallel with the hydraulic actuator, and
the control unit causes the hydraulic fluid to circulate in the warm-up circuit by operating only the first electric hydraulic pump to perform the health monitoring for the first electric hydraulic pump, and causes the hydraulic fluid to circulate in the warm-up circuit by operating only the second electric hydraulic pump to perform the health monitoring for the second electric hydraulic pump.

7. The EHA system for lifting or lowering the leg according to claim 6, wherein the control unit:
performs a warm-up operation of causing the hydraulic fluid to circulate in the warm-up circuit by operating both the first electric hydraulic pump and the second electric hydraulic pump, and after the warm-up operation, performs the health monitoring for the first electric hydraulic pump by operating only the first electric hydraulic pump and performs the health monitoring for the second electric hydraulic pump by operating only the second electric hydraulic pump.

8. The EHA system for lifting or lowering the leg according to claim 5, wherein the hydraulic actuator is an extendable hydraulic cylinder.

9. The EHA system for lifting or lowering the leg according to claim 5, further comprising a notification unit configured to notify a result of the health monitoring for the electric hydraulic pump in response to a control signal from the control unit.

10. The EHA system for lifting or lowering the leg according to claim 5, wherein the control unit determines that the electric hydraulic pump is broken down in a case where a time until completion after start of the leg lifting exceeds a preset limit time.

\* \* \* \* \*